(12) United States Patent
Kato

(10) Patent No.: US 7,108,531 B2
(45) Date of Patent: Sep. 19, 2006

(54) METALLIC FACE PLATE FOR AUTOMOTIVE INSTRUMENT CLUSTER

(75) Inventor: Takahira Kato, Novi, MI (US)

(73) Assignee: Denso International America, Inc., Southfield, MI (US)

( * ) Notice: Subject to any disclaimer, the term of this patent is extended or adjusted under 35 U.S.C. 154(b) by 0 days.

(21) Appl. No.: 10/899,731

(22) Filed: Jul. 27, 2004

(65) Prior Publication Data

US 2006/0024999 A1   Feb. 2, 2006

(51) Int. Cl.
   *H01R 13/64*   (2006.01)
(52) U.S. Cl. ........................................... 439/248
(58) Field of Classification Search ............. 439/249, 439/34, 490; 362/30, 23, 249, 489, 26, 326, 362/332; 180/90; 296/196, 70, 72
See application file for complete search history.

(56) References Cited

U.S. PATENT DOCUMENTS

| | | | | |
|---|---|---|---|---|
| 4,447,860 A * | 5/1984 | Stone et al. | ............... | 362/30 |
| 4,882,659 A * | 11/1989 | Gloudemans | ............... | 362/511 |
| 4,975,807 A * | 12/1990 | Ohashi | ............... | 362/23 |
| 5,259,655 A * | 11/1993 | Anderson | ............... | 296/70 |
| 5,678,912 A * | 10/1997 | Ayres et al. | ............... | 362/23 |
| 6,179,429 B1 * | 1/2001 | Sheldon et al. | ............... | 362/26 |
| 6,343,237 B1 * | 1/2002 | Rossow et al. | ............... | 700/83 |
| 6,499,550 B1 * | 12/2002 | Matsuda et al. | ............... | 180/90 |
| 6,517,138 B1 * | 2/2003 | Arthur et al. | ............... | 296/70 |
| 6,785,596 B1 * | 8/2004 | Brandt et al. | ............... | 701/50 |

FOREIGN PATENT DOCUMENTS

| | | |
|---|---|---|
| GB | 692195 | 6/1953 |
| GB | 829588 | 3/1960 |
| JP | 8-189843 | 7/1996 |
| JP | 11-176226 | 7/1999 |
| JP | 2003-130692 | 5/2003 |
| JP | 2003-194596 | 7/2003 |
| JP | 2004-69726 | 3/2004 |

* cited by examiner

*Primary Examiner*—J. F. Duverne
(74) *Attorney, Agent, or Firm*—Harness, Dickey & Pierce, PLC

(57) ABSTRACT

A viewed component of a vehicle instrument cluster includes a planar sheet including a first face and a second face. The first and second sheet are offset by a predetermined thickness. The planar sheet defines a plurality of passages formed entirely through the thickness and extending between the first face and the second face. A translucent layer of material includes an inboard face and an outboard face. The inboard face is disposed on one of the first and second face of the planar sheet and covers the plurality of passages thereat. Markings are arranged on the outboard face of the translucent layer. The markings correspond to identifiable designations on the viewed component.

17 Claims, 3 Drawing Sheets

METALLIC FACE PLATE FOR AUTOMOTIVE INSTRUMENT CLUSTER

FIELD OF THE INVENTION

The present invention relates generally to vehicle instrument clusters and, more particularly, to a face plate for an instrument cluster gauge and a method for incorporating graphics onto the face plate.

BACKGROUND OF THE INVENTION

Instrument clusters on automobiles generally include a plurality of gauges for displaying such operational information such as vehicle speed, engine RPM, engine temperature, fuel level and many other information. The gauges may include analog or digital readings for displaying the information depending on manufacturer and styling preferences. An analog gauge typically includes a faceplate having indicia thereon such as numbers and a pointer for rotating to the appropriate number.

One important design consideration for an instrument cluster and related gauges is the ability of a vehicle operator to easily view and read the gauges in all driving environments. In particular, nighttime driving requires the instrument cluster to illuminate in some fashion whereby the numbers and corresponding pointers are easily distinguishable. A recent styling trend has motivated manufactures to provide instrument clusters having metallic faceplates. While a metallic faceplate may provide a certain aesthetic appeal, it presents challenges for effectively illuminating the gauge at night. In one commonly employed configuration, a metallic faceplate is illuminated by a light source positioned around an outer side boundary. Because of the inherent reflective properties of a metal toned surface, such a configuration may present a less than desirable nighttime viewing experience for the vehicle operator.

SUMMARY OF THE INVENTION

A viewed component of a vehicle instrument cluster includes a planar sheet including a first face and a second face. The first and second sheet are offset by a predetermined thickness. The planar sheet defines a plurality of passages formed entirely through the thickness and extending between the first face and the second face. A translucent layer of material includes an inboard face and an outboard face. The inboard face is disposed on one of the first and second face of the planar sheet and covers the plurality of passages thereat. Markings are arranged on the outboard face of the translucent layer. The markings correspond to identifiable designations on the viewed component.

According to other features, the plurality of passages define individual passages equidistantly offset from adjacent passages. The planar sheet is comprised of metallic material. The markings comprise ink and the identifiable designations comprise characters. A light source proximate to the planar sheet emits light through the plurality of passages.

A viewed component of a vehicle instrument luster includes a light source for emitting light toward the viewed component. A planar sheet includes a first face and a second face offset by a predetermined thickness. The planar sheet defines a first plurality of passages extending entirely through the sheet. A second plurality of passages extend partially through the thickness from one of the first and second face. The second plurality of markings are in the form of markings, the markings corresponding to an identifiable designation on the viewed component. The planar sheet is adapted to pass light from the light source through the first plurality of passages and preclude light from passing through the second plurality of passages.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
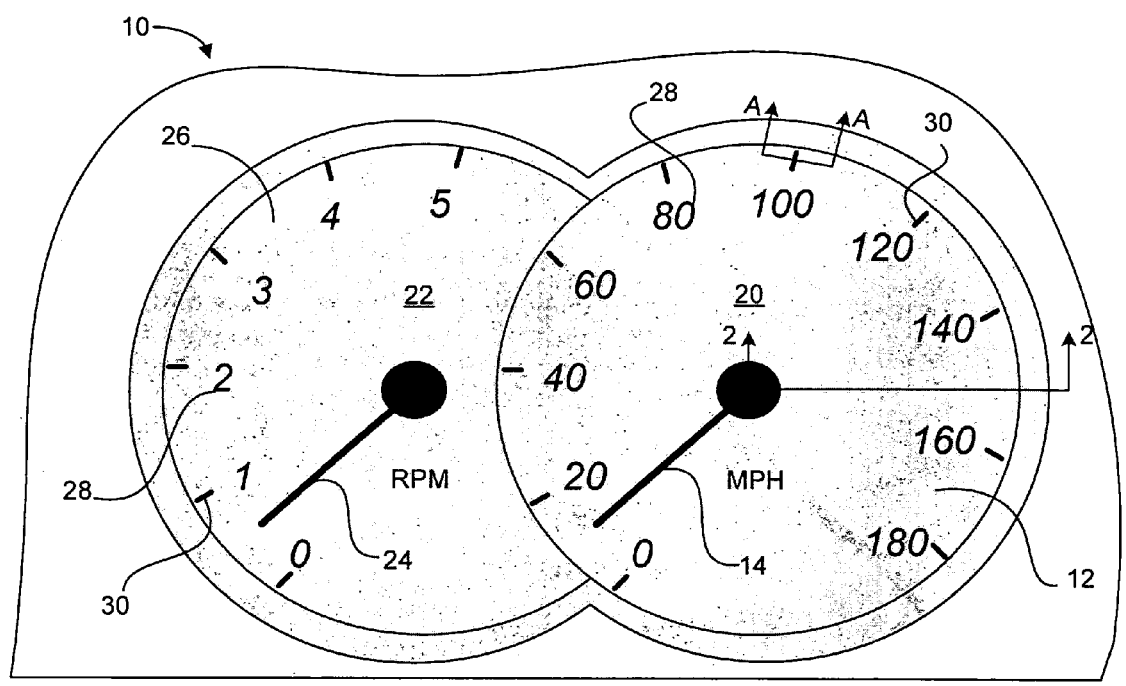
FIG. 1 illustrates a front side of an exemplary instrument cluster for use in automotive vehicles.

FIG. 1 depicts an exemplary instrument cluster 10 in an automotive vehicle. The instrument cluster 10 may include various gauges and dials which are to be viewed and/or operated by an occupant of the vehicle. For example, a speedometer 12 may be used to display the speed which a vehicle is traveling. The speedometer 12 includes a movable pointer 14 which correlates to the speed of the vehicle. To provide meaningful graphical information to the occupant, a faceplate 20 of the speedometer 12 forms the background for the pointer 14 of the speedometer 12. In this example, a faceplate 22 and pointer 24 are similarly provided for providing engine speed information on a tachometer 26. The exemplary faceplates 12, 22 provide a scale of numbers 28 and grad lines 30, such that the respective pointers 14, 24 are operable to point to the applicable number 28 which corresponds to the speed of the vehicle and engine respectively.

Figure 2:
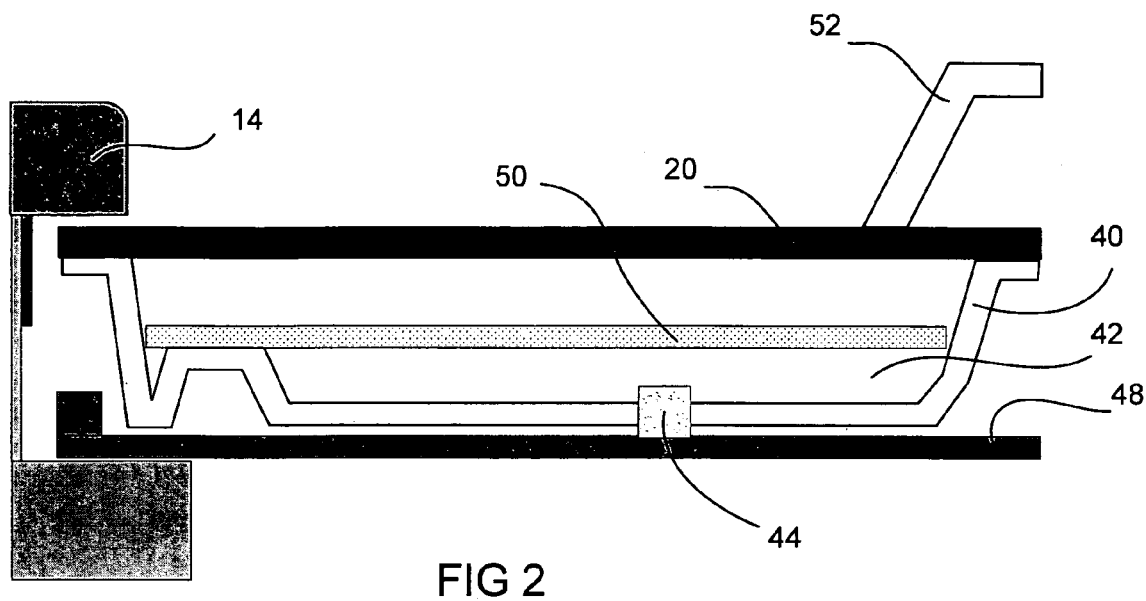
FIG. 2 is a cross-sectional view of FIG. 1 taken along line 2—2.

With continued reference to FIG. 1 and further reference to FIGS. 2–4, the faceplates 20, 22 will be described in greater detail. The following discussion will be directed toward the faceplate 20 of the speedometer 12, however it is appreciated that the same may be applied to the faceplate 22 or any other faceplates included in the instrument cluster 10. The faceplate 20 is attached to a reflector 40 and defines a cavity 42. A light source 44 extending from printed circuit board (PCB) 48 protrudes into the cavity 42 for emitting light toward the faceplate 20 as will be described. A diffuser 50 is mounted in the cavity 42 between the light source 44 and the faceplate 20. A trim plate 52 is arranged around an outer border of the faceplate 20. It is appreciated that the configuration illustrated in FIG. 2 is merely exemplary and other arrangements may be provided.

Figure 3:
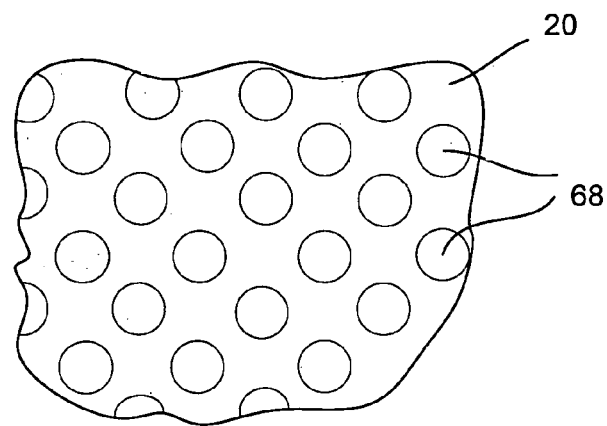
FIG. 3 is an enlarged plan view of a portion of a faceplate incorporated in one of the gauges illustrated in FIG. 1.
Figure 4:
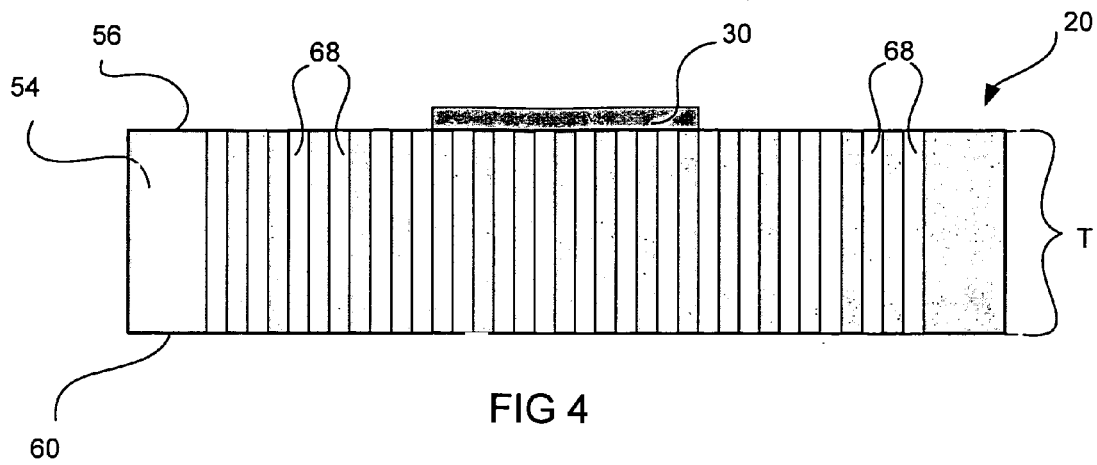
FIG. 4 is a fragmentary, cross sectional view of a faceplate illustrated in FIG. 1 taken along line A—A in accordance to the present invention.

With specific reference to FIGS. 3 and 4, the faceplate 20 is generally comprised of a planar metallic sheet of material 54 such as but not limited to stainless steel or aluminum. The planar sheet 54 defines a first face 56 and a second face 60 offset by a predetermined thickness T. The planar sheet 54 further defines a plurality of passages 68 formed entirely therethrough extending between the first face 56 and the second face 60. The plurality of holes 68 may be formed by etching or any other suitable method. As illustrated in FIG. 3, the plurality of holes are arranged equidistantly across the planar sheet.

The numbers 28 and grad lines 30 are adhesively attached onto the first face 56 of the planar sheet 54 in the desired orientation. The numbers 28 and grad lines 30 may include adhesive film having the numbers 28 and grad lines 30 formed thereon such as by ink or other technique.

Referring now to FIGS. 1 and 4, the light source 44 is provided proximate the second face 60 for emitting light through the plurality of passages 68 and out the first face 56. The light source 44 may comprise any suitable light emitting source for use in an instrument cluster such as, but not limited to a light bulb or light emitting diode. In the example shown in FIG. 4, the numbers 28 and grad lines 30 effectively block the light from passing through the planar sheet 54 to present identifiable markings easily viewable by a vehicle operator.

Figure 5:
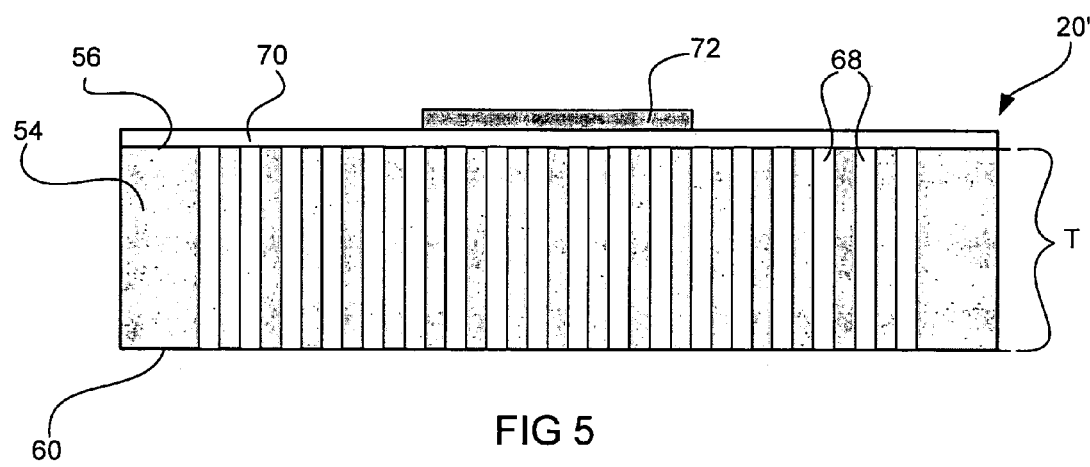
FIG. 5 is a fragmentary, cross sectional view of a faceplate illustrated in FIG. 1 taken along line A—A in accordance to a second aspect of the present invention.

With reference now to FIG. 5, a faceplate 20' according to additional features is shown. The faceplate 20' incorporates the planar sheet of material 54 having the plurality of passages 68 formed therein. The faceplate 20' further includes a translucent layer of material 70 having printed numbers and grad lines 72 thereon. The translucent layer 70 may comprise any suitable translucent material such as plastic for example. The translucent layer 70 is press-fit into an engaged relationship with the planar sheet 54. It is appreciated that the translucent layer 70 may be attached by other methods such as adhesive for example. The configuration of FIG. 5 presents a cost effective method of first arranging all identifiable markings 72 onto a translucent layer of material 70 and subsequently placing the translucent layer 70 onto the planar sheet 54 into an engaged position.

Figure 6:
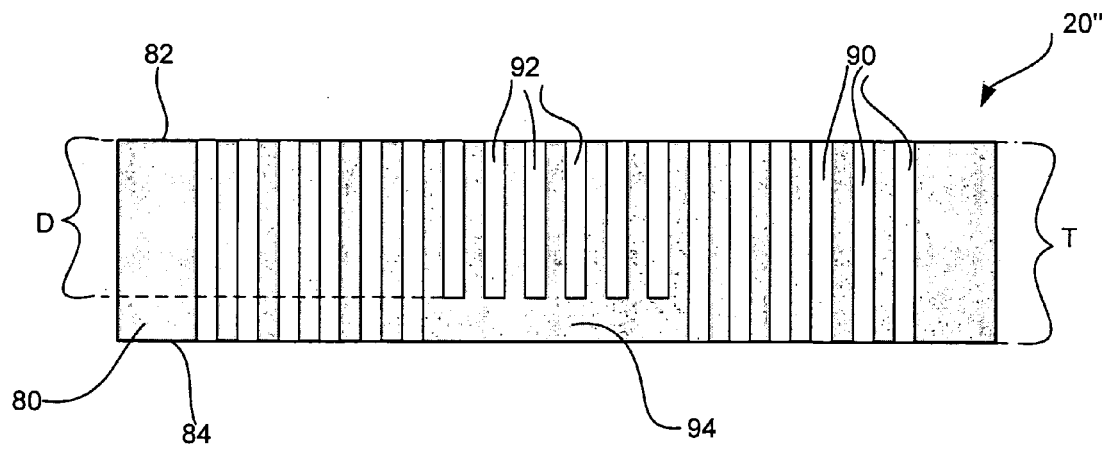
FIG. 6 is a fragmentary, cross sectional view of a faceplate illustrated in FIG. 1 taken along line A—A in accordance to a third aspect of the present invention.

With reference now to FIG. 6, a faceplate 20" according to additional features is shown. The faceplate 20" is generally comprised of a planar metallic sheet of material 80 such as but not limited to stainless steel or aluminum. The planar sheet 80 defines a first face 82 and a second face 84 offset by a predetermined thickness T. The planar sheet 80 includes a first plurality of passages 90 formed entirely therethrough extending between the first face 82 and the second face 84. A second plurality of passages 92 are formed partially through the thickness T and extend from the first face 82 into the planar sheet a distance D. The second plurality of passages 92 are arranged in the form of markings 94 across the planar sheet. The markings define the numbers and grads of the faceplate. The second plurality of passages 92 are adapted to preclude light from passing through the planar sheet 80. It is appreciated that while the passages 92 are shown formed from the first face 82, they may alternatively be formed from the second face 84.

While the invention has been described in the specification and illustrated in the drawings with reference to various embodiments, it will be understood by those skilled in the art that various changes may be made and equivalents may be substituted for elements thereof without departing from the scope of the invention as defined in the claims. Furthermore, the mixing and matching of features, elements and/or functions between various embodiments is expressly contemplated herein so that one of ordinary skill in the art would appreciate from this disclosure that features, elements and/or functions of one embodiment may be incorporated into another embodiment as appropriate, unless described otherwise above. Moreover, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A viewed component of a vehicle instrument cluster, comprising:

a planar sheet including a first face and a second face offset by a predetermined thickness, said planar sheet defining a plurality of passages formed entirely through said thickness and extending between said first face and said second face;

a translucent layer of material having an inboard face and an outboard face, said inboard face disposed on one of said first and second face of said planar sheet and covering said plurality of passages thereat;

markings arranged on said outboard face of said translucent layer, said markings corresponding to identifiable designations on the viewed component;

at least one light source, said light source located on an inboard side of said planar sheet;

a light reflector, said reflector arranged to reflect light from said light source toward said planar sheet; and a light diffuser, said light diffuser arranged between said light reflector and said planer sheet.

2. The viewed component of claim 1 wherein said plurality of passages define individual passages equidistantly offset from adjacent passages.

3. The viewed component of claim 1 wherein said planar sheet is comprised of a metallic material.

4. The viewed component of claim 3 wherein said metallic material consists of one of stainless steel and aluminum.

5. The viewed component of claim 1 wherein said translucent layer is press fit onto said planar sheet.

6. The viewed component of claim 1 wherein said markings comprise ink.

7. The viewed component of claim 1 wherein said identifiable designations comprise characters.

8. The viewed component of claim 1 wherein said translucent layer is comprised of plastic.

9. A viewed component of a vehicle instrument cluster, the instrument cluster having a light source that emits light toward the viewed component, comprising:

a planar sheet including a first face and a second face offset by a predetermined thickness, said planar sheet defining a first plurality of passages extending entirely through said sheet between said first face and said second face and a second plurality of passages extending partially through said thickness from one of said first and second face; and wherein said second plurality of passages are in the form of markings, said markings corresponding to identifiable designations on the viewed component, the planar sheet adapted to pass light from the light source through said first plurality of passages and preclude light from passing through said second plurality of passages.

10. The viewed component of claim 9 wherein said planar sheet is comprised of a metallic material.

11. The viewed component of claim 10 wherein said metallic material consists of one of stainless steel and aluminum.

12. The viewed component of claim 9 wherein said translucent layer is press fit onto said planar sheet.

13. The viewed component of claim 9 wherein said markings comprise ink.

14. The viewed component of claim 9 wherein said identifiable designations comprises characters.

15. The viewed component of claim 9 wherein said translucent layer is comprised of plastic.

16. An instrument apparatus comprising:
a planar sheet, the planar sheet comprising:
a first face and a second face, the planar sheet further defining a plurality of parallel passages, said plurality of passages further comprising:
a first group of passages that pass through the first face and the second face; and
a second group of passages that only pass through the first face; and
a marking area of the planar sheet, the marking area designating numerical graduations, wherein the depth of the second group of passages is greater than a thickness of the marking area.

17. The instrument apparatus of claim 16, further comprising:
a light source that produces light, wherein
the first group of passages permits light to pass through the planar sheet; and
the marking area of the planar sheet is situated perpendicularly to longitudinal axes of the second passages.

* * * * *